Aug. 5, 1958 — C. BRAMMING — 2,846,104
GASKET FOR VACUUM BOTTLES
Filed June 26, 1956 — 2 Sheets-Sheet 1
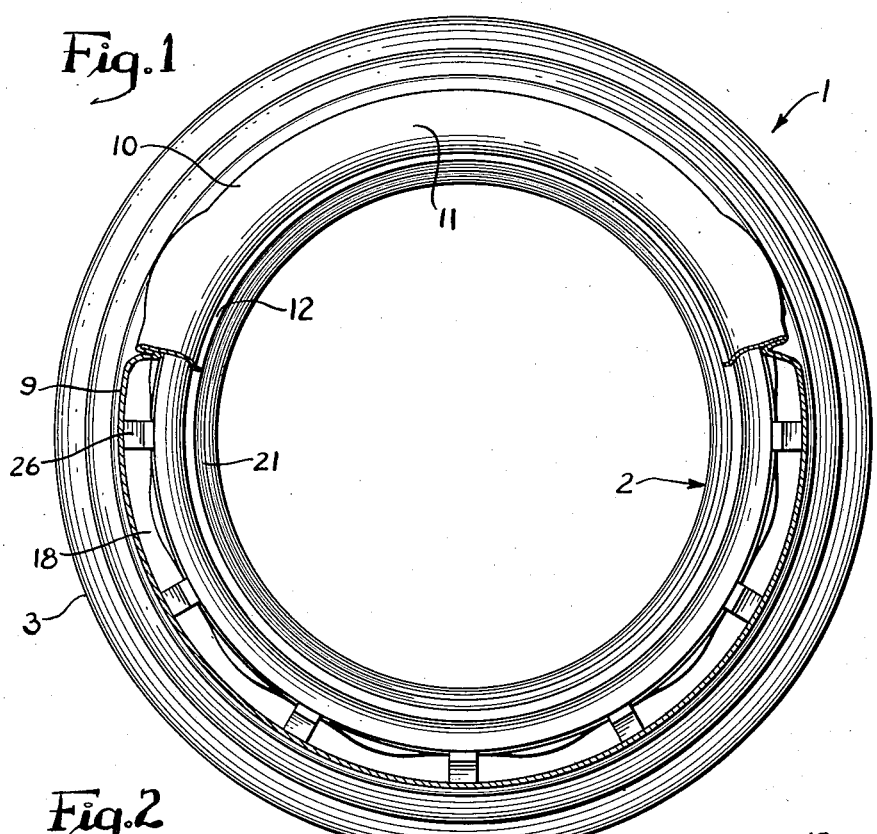
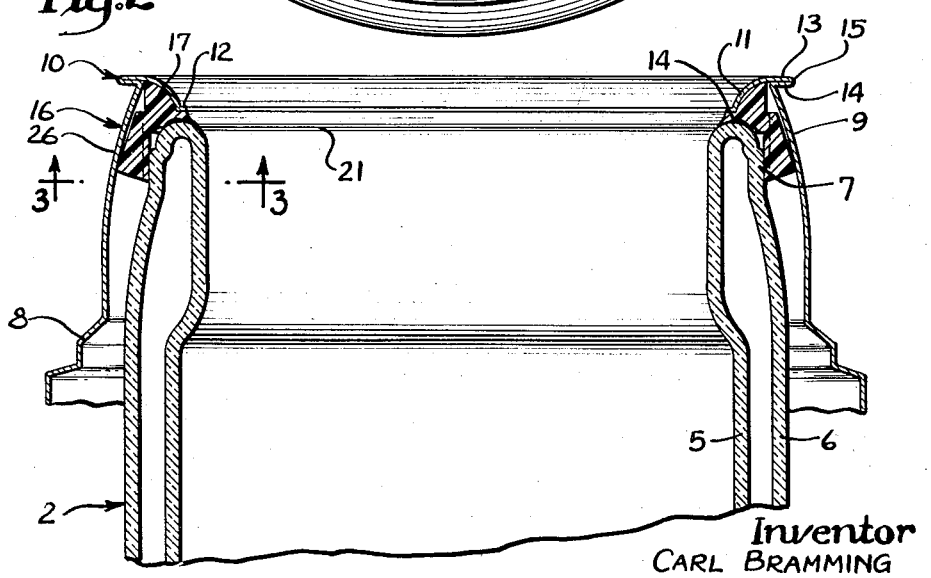
Inventor
CARL BRAMMING
by: Ooms, McDougall, Williams & Hersh
attys.

Aug. 5, 1958     C. BRAMMING     2,846,104
GASKET FOR VACUUM BOTTLES
Filed June 26, 1956     2 Sheets-Sheet 2
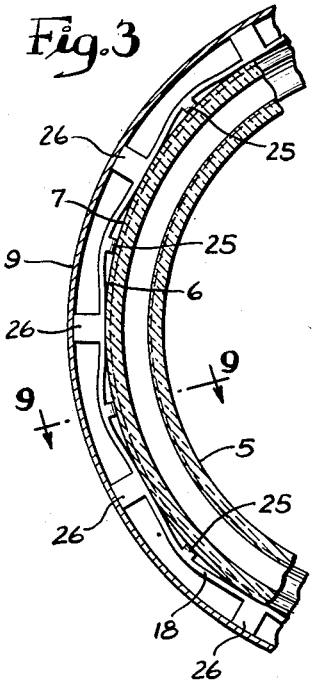
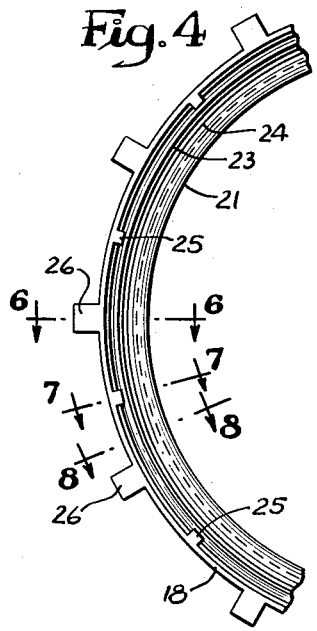
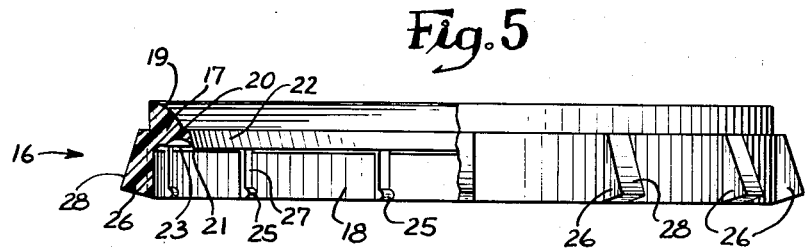
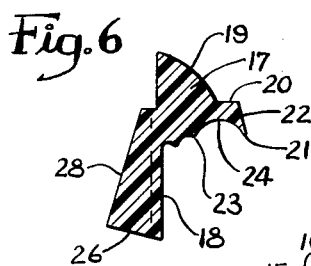
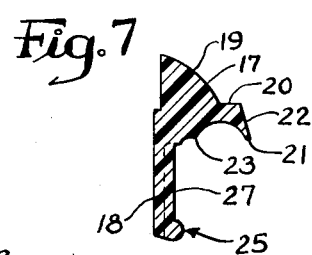
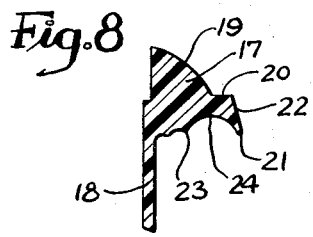
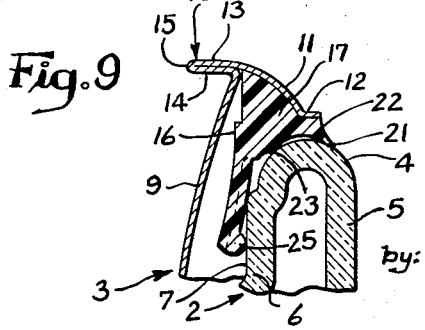
Inventor
CARL BRAMMING
by: Ooms, McDougall, Williams & Hersh
attys.

United States Patent Office 2,846,104
Patented Aug. 5, 1958

2,846,104

GASKET FOR VACUUM BOTTLES

Carl Bramming, Nashville, Tenn., assignor to Aladdin Industries, Incorporated, Nashville, Tenn., a corporation of Illinois Application June 26, 1956, Serial No. 594,029

11 Claims. (Cl. 215—13)

This invention relates to vacuum bottles and pertains particularly to gaskets adapted to be seated between the upper end of a vacuum-insulated filler and the upper end of the surrounding protective jacket in a vacuum bottle.

One object of the present invention is to provide a new and improved gasket that will compensate for slight variations in the size of the vacuum-insulated filler, and will form a fluid-tight seal between the upper ends of the jacket and the filler, despite such variations.

A further object is to provide such a new and improved gasket that will be tightly seated between the upper ends of the filler and the jacket so as to prevent play at this point, despite minor variations in the size of the filler.

Another object is to provide such a new and improved gasket that may be made satisfactorily out of polyethylene, or some other similar plastic material of a character somewhat harder than the natural and synthetic rubbers heretofore generally used in vacuum bottle gaskets.

Thus, it is another object to provide a new and improved vacuum bottle gasket that will be highly effective yet extremely inexpensive.

Further objects and advantages of the present invention will appear from the following description, taken with accompanying drawings, in which:

Fig. 1 is a plan view of a vacuum bottle constituting an illustrative embodiment of the invention, a portion of the protective jacket being shown in section for clarity of illustration.

Fig. 2 is a fragmentary longitudinal sectional view showing the upper end of the vacuum bottle of Fig. 1.

Fig. 3 is a fragmentary cross sectional view, looking upwardly, generally along a line 3—3 in Fig. 2.

Fig. 4 is a fragmentary bottom view of the gasket employed in the vacuum bottle of Fig. 1.

Fig. 5 is an elevational view of the gasket, shown partly in section.

Figs. 6, 7 and 8 are enlarged cross sectional views of the gasket, when in a free state, the views being taken generally along lines 6—6, 7—7, and 8—8 in Fig. 4.

Fig. 9 is an enlarged sectional view similar to Fig. 7 but showing the gasket in its mounted position between the filler and the jacket, the view being taken generally along a line 9—9 in Fig. 3.

As already indicated, Fig. 1 illustrates a vacuum bottle 1 which comprises a vacuum-insulated glass filler 2 enclosed within an outer protective jacket 3, which may be made of metal, plastics, or some other suitable material. The exact construction of the filler 2 is not critical for the purposes of the present invention. However, the illustrated filler 2 has a rounded annular upper edge 4 which represents the junction of inner and outer glass walls 5 and 6. The outer wall 6 has a generally cylindrical outer surface 7 extending downwardly from the rounded upper edge 4. It will be understood that the construction of the filler 2 may be varied widely within the scope of the present invention.

Likewise, the exact construction of the jacket 3 is not critical, for the purposes of the present invention. However, the illustrated jacket 3 has an annular upper portion 8 which surrounds the upper end of the filler 1. The upper portion 8 may be integral with the jacket 3 or formed as a removable collar. As shown, the upper portion 8 has an annular wall 9 which is spaced outwardly from the cylindrical outer surface 7 on the filler 1. The annular wall 9 is nearly cylindrical but actually tapers upwardly to an appreciable extent.

At the upper end of the annular wall 9, the jacket 3 is formed with an outwardly projecting flange 10 which forms an effective pouring lip. It will be seen that the lip 10 is generally horizontal and is arranged to overhang the annular wall 9.

An inner flange 11 is also formed on the jacket 3 and is arranged to project inwardly and slope downwardly from the outer flange or pouring lip 10. Thus, the upper surface of the inner flange 11 is smoothly curved and downwardly tapered so that liquids will flow smoothly therealong when poured out of the filler 2. The inner edge of the flange 11 is formed into a narrow substantially horizontal ledge 12.

It will be realized that the annular wall 9, the pouring lip 10, and the inner flange 11 might be molded out of plastics or formed in some other suitable manner. However, as illustrated, these components are formed in one piece out of sheet metal. Thus, the outer flange or pouring lip 10 is double-folded, or, in other words, comprises upper and lower wall elements 13 and 14 which are joined by an annular fold 15 at the extremity of the flange 10. The lower flange element 14 is formed outwardly from the annular wall 9. It will be seen that the inner flange 11 constitutes a smooth continuation of the upper flange element 13.

A gasket 16 is seated between the upper ends of the filler 2 and the jacket 3 to center the filler and prevent leakage of liquids between the filler and the jacket. Gaskets of various kinds have been employed in the past in similar situations. Generally, the gaskets have been made of fairly soft natural or synthetic rubber. However, such rubber gaskets have various disadvantages. Thus, rubber ordinarily has a strong taste and odor and hence tends to impart an objectionable taste to liquids coming in contact with a rubber gasket. Rubber is inherently quite expensive and is expensive to mold into gaskets. It is possible to produce synthetic rubber that has relatively little taste, but such rubber is especially expensive.

It is difficult and practically impossible to make glass vacuum insulated fillers with the extreme precision usually achieved in the manufacture of metal and plastic components. Thus, the fillers may vary slightly in size. In particular, the diameter of the cylindrical surface 7 on the filler 2 may vary slightly from one filler to another, in commercial production. This being the case, the gasket must compensate for such variations in size. In other words, the gasket must provide a liquid-tight seal, despite such variations in size. Moreover, the gasket must be seated tightly and without play between the filler and the jacket, despite the slight variations in the filler. In the past, these requirements have generally necessitated the provision of a gasket made of quite soft rubber or synthetic rubber.

While the illustrated gasket 16 might be made of rubber or synthetic rubber, it is preferred that it be made out of a suitably flexible plastic material, such as polyethylene. While polyethylene and similar materials are highly flexible and resilient, they are not as soft as natural or synthetic rubber. Nevertheless, the gasket 16 may be made of such plastic materials and yet will be capable of compensating for the usual commercial variations in the size of the filler 2. Polyethylene and other similar plastic materials have the additional initial advantage of being absolutely tasteless.

The illustrated gasket 16 comprises an annular inner flange portion 17 and a depending skirt portion 18. It will be seen that the inner flange 17 is adapted to fit between the rounded upper edge 4 on the filler 2 and the inner flange 11 on the jacket 3. The skirt portion 18 is disposed between the annular walls 7 and 9 on the filler 2 and the jacket 3.

The inner flange 17 has a curved, downwardly tapering, internal upper surface 19 which fits snugly under the inner flange 11 on the jacket 3. A generally horizontal ledge 20 is formed at the inside of the upper surface 19 to fit under the ledge 12 on the jacket flange 11.

To prevent leakage of liquids between the gasket 16 and the filler 2, the underside of the gasket flange 17 is arranged to form a seal with the rounded upper edge 4 of the filler 2. Thus, a sharp, annular, depending lip or edge 21 is formed at the inner extremity of the gasket flange 17. When the gasket 16 is in its position of use, seated on the filler 2, the lip 21 is flexed inwardly and upwardly, as clearly shown in Fig. 9, so that the lip will form a liquid-tight seal with the rounded upper edge 4 on the filler. An inclined annular surface 22 extends upwardly from the lip 21 on the inside of the gasket flange 17. It will be seen that the surface 22 is smooth and downwardly tapering in form to promote smooth flow of liquids out of the filler 2.

A secondary seal is formed with the rounded upper edge 4 of the filler by a second, sharp depending annular edge 23, formed on the underside of the gasket flange 17 and spaced outwardly from the edge or lip 21. Between the edges 21 and 23, the underside of the gasket flange 17 is arching in form along a curved, downwardly concave annular surface 24. The curvature of the surface 24 is more pronounced than that of the rounded filler edge 4 so that the surface 24 will arch above the rounded edge 4, as clearly shown in Fig. 9. This arrangement provides for easy compression of the gasket flange 17 into sealing engagement with the rounded edge 4 on the filler. Such compression flexes the sharp annular edges or lips 21 and 23 and insures a tight seal.

The skirt portion 18 of the gasket 16 is substantially cylindrical, when the gasket is in a free state, as shown in Figs. 5 and 8. In order that the skirt 18 may be adequately flexible, it is made quite thin in cross section.

In the illustrated construction, the skirt 18 has inward projections 25 which engage the filler 2, and outward projections 26 for engaging the inside of the jacket 3. More specifically, the inward projections 25 engage the cylindrical outer wall 7 at the upper end of the filler 2, while the outward projections 26 engage the inside of the tapering annular wall 9 on the jacket 3. The inward and outward projections 25 and 26 are both local in character and are distributed angularly around the skirt 18. However, it will be apparent from Figs. 3 and 4 that the inward projections 25 are interspersed between the outward projections 26. In other words, the inward and outward projections 25 and 26 occur alternately around the periphery of the thin annular skirt 18.

It will be seen from Figs. 5 and 7 that the inward projections 25 are disposed at the lower edge of the gasket skirt 18. The projections 25 are rounded in contour. Ridges 27 of less height than the projections 25 extend upwardly from the projections along the inside of the skirt 18.

The illustrated outward projections 26 are buttress-like in form, as will be apparent from Figs. 5 and 6. Inclined outer surfaces 28 are formed on the outer edges of the projections 26 to conform generally to the inside of the tapering annular wall 9 on the jacket 3.

The inward projections 25 on the skirt 18 extend inwardly to a circle of a smaller diameter than the nominal outer diameter of the filler 2 at the cylindrical surface 7. Thus, there is an interference fit between the inward projections 25 and the cylindrical outer surface 7 on the filler 2. Due to the flexibility of the thin skirt 18, the projections 25 nevertheless may readily be pushed downwardly over the cylindrical surface 7. Thus, the skirt 18 will be flexed outwardly at each of the inward projections 25, as will be apparent from Fig. 3. The outward projections 26 fit snugly within the annular wall 9 on the jacket 3. Moreover, the outward projections 26 reinforce the skirt 18 and tend to localize the flexure of the skirt at the individual inward projections 25. Thus, the skirt 18 assumes a wave-like form when the gasket 16 is in its normal position of use. This will be clearly apparent from Fig. 3. It has already been noted that the outer diameter of the filler 2 will vary appreciably in commercial production. However, the gasket 16 will accommodate such variations. If the cylindrical surface 7 on the filler 2 is slightly oversize, the thin, flexible skirt portion 18 will be flexed outwardly at the inward projections 25 to an extent somewhat greater than normal. If the cylindrical surface 7 is somewhat undersize, the skirt 18 will be flexed to a smaller extent than normal. However, within a considerable range of size variation, the inward projections 25 will remain tightly seated around the filler, so that there will be no play between the filler and the gasket. Thus, the filler will be kept centered within the jacket, so as to assure the maintenance of a perfect seal between the gasket and the filler.

As shown in Fig. 3, the filler 2 is of the maximum size that would be tolerated in commercial production. Thus, the extent of outward flexure of the skirt 18 is as great as will ever be expected of the skirt. It will be noted that the cylindrical surface 7 on the filler and the inside of the skirt 18 are in engagement, or virtually so, at the outward projections 26.

It will be apparent that polyethylene or other suitable plastic materials will provide adequate flexibility in the skirt 18 and sealing lips 21 and 23 of the gasket 16. Thus, these plastic materials may be employed in the gasket instead of rubber, with the advantages of economy and freedom from any objectionable taste. Moreover, the plastic materials may be molded very readily and accurately. In addition, the plastic gasket is easy to clean.

Due to the localized flexing of the gasket skirt at the inward projections, the gasket always fits snugly between the filler and the jacket, in spite of normal variations in the diameter of the filler. The flexible lips on the underside of the gasket insure the maintenance of a perfect seal between the filler and the jacket.

Various modifications, alternative constructions and equivalents may be employed without departing from the true spirit and scope of the invention as exemplified in the foregoing decription and defined in the following claims.

I claim:

1. In a vacuum bottle, the combination comprising a glass vacuum-insulated filler having a rounded annular upper edge and a generally cylindrical outer surface extending downwardly therefrom, a protective jacket around said filler and having an annular wall spaced outwardly from said outer surface of said filler, an outer flange integral with and projecting outwardly from the upper end of said annular wall and defining a pouring lip, an inner flange integral with and projecting inwardly from said annular wall and sloping downwardly from said outer flange in overhanging relation to said rounded upper edge of said filler, an annular gasket seated between the upper ends of said jacket and said filler for centering said filler and preventing leakage of fluid between said jacket and said filler, an inner flange portion on said gasket and received between said rounded upper edge on said filler and said inner flange on said jacket, said inner flange portion of said gasket having inner and outer sharp annular downwardly projecting edges on its underside in sealing engagement with said rounded upper edge on said filler, said inner flange portion having a portion arching upwardly above the curve of said rounded upper edge between said sharp annular edges, and a depending flexible thin-walled annular skirt portion on said gasket and extending around said outer surface of said filler between said outer surface and said annular wall on said jacket, said skirt portion having a plurality of local inward projections thereon distributed therearound in angularly spaced relation and engaging said outer surface of said filler at angularly spaced points, said skirt portion having a plurality of local outward projections interspersed angularly between said inward projections and engaging said annular wall of said jacket at angularly spaced points, said skirt portion being substantially circular when in a free state but being flexed in wave-like fashion when mounted between said jacket and said filler, said skirt portion being flexed outwardly at each inward projection.

2. In a vacuum bottle, the combination comprising a glass vacuum-insulated filler having an annular upper edge and an outer surface extending downwardly therefrom, a protective jacket around said filler and having an annular wall spaced outwardly from said outer surface of said filler, an inner flange projecting inwardly from said annular wall, an annular gasket seated between the upper ends of said jacket and said filler for centering said filler and preventing leakage of fluid between said jacket and said filler, an inner flange portion on said gasket and received between said upper edge on said filler and said inner flange on said jacket, said inner flange portion of said gasket having an annular lip on its underside and in sealing engagement with said upper edge on said filler, and a depending flexible thin-walled annular skirt portion on said gasket and extending around said outer surface of said filler between said outer surface and said annular wall on said jacket, said skirt portion having a plurality of local inward projections thereon distributed therearound in angularly spaced relation and engaging said outer surface of said filler at angularly spaced points, said skirt portion having a plurality of local outward projections interspersed angularly between said inward projections and engaging said annular wall of said jacket at angularly spaced points, said skirt portion being substantially circular when in a free state but being flexed in wave-like fashion when mounted between said jacket and said filler, said skirt portion being flexed outwardly at each inward projection.

3. In a vacuum bottle, the combination comprising a glass vacuum-insulated filler having an annular upper edge and an outer surface extending downwardly therefrom, a protective jacket around said filler and having an annular wall spaced outwardly from said outer surface of said filler, an inner flange projecting inwardly from said annular wall, an annular gasket seated between the upper ends of said jacket and said filler for centering said filler and preventing leakage of fluid between said jacket and said filler, an inner flange portion on said gasket and received between said upper edge on said filler and said inner flange on said jacket, said inner flange portion of said gasket having means in sealing engagement with said upper edge on said filler, and a depending flexible thin-walled annular skirt portion on said gasket and extending around said outer surface of said filler between said outer surface and said annular wall on said jacket, said skirt portion having a plurality of local inward projections thereon distributed therearound in angularly spaced relation and engaging said outer surface of said filler at angularly spaced points, said skirt portion having a plurality of local outward projections interspersed angularly between said inward projections and engaging said annular wall of said jacket at angularly spaced points, said skirt portion being substantially circular when in a free state but being flexed in wave-like fashion when mounted between said jacket and said filler, said skirt portion being flexed outwardly at each inward projection.

4 For use in a vacuum bottle between a glass vacuum-insulated filler, having a rounded annular upper edge and a generally cylindrical outer surface extending downwardly therefrom, and a protective jacket around said filler and having an annular wall spaced outwardly from said outer surface of said filler and an inner flange integral with and projecting inwardly from said annular wall: an annular gasket adapted to be seated between the upper ends of said jacket and said filler for centering said filler and preventing leakage of fluid between said jacket and said filler, said gasket comprising an inner flange portion adapted to be received between said rounded upper edge on said filler and said inner flange on said jacket, said inner flange portion of said gasket having inner and outer sharp annular downwardly projecting sealing lips on its underside adapted to engage said rounded upper edge on said filler, said inner flange portion having a portion arching upwardly between said sharp annular lips, and a depending flexible thin-walled annular skirt portion on said gasket and adapted to extend around said outer surface of said filler between said outer surface and said annular wall on said jacket, said skirt portion having a plurality of local inward projections thereon distributed therearound in angularly spaced relation and adapted to engage said outer surface of said filler at angularly spaced points, said skirt portion having a plurality of local outward projections interspersed angularly between said inward projections and adapted to engage said annular wall of said jacket at angularly spaced points, said skirt portion being substantially circular when in a free state but being adapted to be flexed in wave-like fashion when mounted between said jacket and said filler, said skirt portion being adapted to be flexed outwardly at each inward projection.

5. For use in a vacuum bottle between a glass vacuum-insulated filler, having an annular upper edge and an outer surface extending downwardly therefrom, and a protective jacket around said filler and having an annular wall spaced outwardly from said outer surface of said filler and an inner flange integral with and projecting inwardly from said annular wall: an annular gasket adapted to be seated between the upper ends of said jacket and said filler for centering said filler and preventing leakage of fluid between said jacket and said filler, said gasket comprising an inner flange portion adapted to be received between said rounded upper edge on said filler and said inner flange on said jacket, said inner flange portion of said gasket having sealing means adapted to engage said upper edge on said filler, and a depending flexible thin-walled annular skirt portion on said gasket and adapted to extend around said outer surface of said filler between said outer surface and said annular wall on said jacket, said skirt portion having a plurality of local inward projections thereon distributed therearound in angularly spaced relation and adapted to engage said outer surface of said filler at angularly spaced points, said skirt portion having a plurality of local outward projections interspersed angularly between said inward projections and adapted to engage said annular wall of said jacket at angularly spaced points, said skirt portion being substantially circular when in a free state but being adapted to be flexed in wave-like fashion when mounted between said jacket and said filler, said skirt portion being adapted to be flexed outwardly at each inward projection.

6. For use in a vacuum bottle between a glass vacuum-insulated filler, having an annular upper edge and an outer surface extending downwardly therefrom, and a protective jacket around said filler and having an annular wall spaced outwardly from said outer surface of said filler and an inner flange integral with and projecting inwardly from said annular wall: an anular gasket adapted to be seated between the upper ends of said jacket and said filler for centering said filler and preventing leakage of fluid between said jacket and said filler, said gasket comprising an inner flange portion adapted to be received between said rounded upper edge on said filler and said inner flange on said jacket, said inner flange portion of said gasket having a sealing lip adapted to engage said upper edge on said filler, and a depending flexible thin-walled annular skirt portion on said gasket and adapted to extend around said outer surface of said filler between said outer surface and said annular wall on said jacket, said skirt portion having a plurality of local inward projections thereon distributed therearound in angularly spaced relation and adapted to engage said outer surface of said filler at angularly spaced points, said skirt portion having a plurality of local outward projections interspersed angularly between said inward projections and adapted to engage said annular wall of said jacket at angular spaced points, said skirt portion being substantially circular when in a free state but being adapted to be flexed in wave-like fashion when mounted between said jacket and said filler, said skirt portion being adapted to be flexed outwardly at each inward projection.

7. In a vacuum bottle having a glass vacuum-insulated filler with a rounded annular upper edge and an outer surface extending downwardly therefrom, and a protective jacket around said filler and having an annular wall spaced outwardly from said outer surface of said filler and an inner flange projecting inwardly from said annular wall; an annular gasket seated between the upper ends of said jacket and said filler for centering said filler and preventing leakage of fluid between said jacket and said filler, an inner flange portion on said gasket and received between said rounded upper edge on said filler and said inner flange on said jacket, said inner flange portion of said gasket having inner and outer sharp annular downwardly projecting lips on its underside in sealing engagement with said rounded upper edge on said filler, said inner flange portion having a portion arching upwardly above the curve of said rounded upper edge between said sharp annular lips, and a depending flexible thin-walled annular skirt portion on said gasket and extending around said outer surface of said filler between said outer surface and said annular wall on said jacket, said skirt portion having a plurality of local inward projections thereon distributed therearound in angularly spaced relation and engaging said outer surface of said filler at angularly spaced points, said skirt portion having a plurality of local outward projections interspersed angularly between said inward projections and engaging said annular wall of said jacket at angularly spaced points, said skirt portion being substantially circular when in a free state but being flexed in wave-like fashion when mounted between said jacket and said filler, said skirt portion being flexed outwardly at each inward projection.

8. In a vacuum bottle having a glass vacuum-insulated filler with an annular upper edge and an outer surface extending downwardly therefrom, and a protective jacket around said filler and having an annular wall spaced outwardly from said outer surface of said filler and an inner flange projecting inwardly from said annular wall; an annular gasket seated between the upper ends of said jacket and said filler for centering said filler and preventing leakage of fluid between said jacket and said filler, an inner flange portion on said gasket and received between said rounded upper edge on said filler and said inner flange on said jacket, said inner flange portion of said gasket having a lip in sealing engagement with said upper edge on said filler, and a depending flexible thin-walled annular skirt portion on said gasket and extending around said outer surface of said filler between said outer surface and said annular wall on said jacket, said skirt portion having a plurality of local inward projections thereon distributed therearound in angularly spaced relation and engaging said outer surface of said filler at angularly spaced points, said skirt portion having a plurality of local outward projections interspersed angularly between said inward projections and engaging said annular wall of said jacket at angularly spaced points, said skirt portion being substantially circular when in a free state but being flexed in wave-like fashion when mounted between said jacket and said filler, said skirt portion being flexed outwardly at each inward projection.

9. In a vacuum bottle having a glass vacuum-insulated filler with an annular upper edge and an outer surface extending downwardly therefrom, and a protective jacket around said filler and having an annular wall spaced outwardly from said outer surface of said filler and an inner flange projecting inwardly from said annular wall; an annular gasket seated between the upper ends of said jacket and said filler for centering said filler and preventing leakage of fluid between said jacket and said filler, an inner flange portion on said gasket and received between said rounded upper edge on said filler and said inner flange on said jacket, said inner flange portion of said gasket having means in sealing engagement with said upper edge on said filler, and a depending flexible thin-walled annular skirt portion on said gasket and extending around said outer surface of said filler between said outer surface and said annular wall on said jacket, said skirt portion having a plurality of local inward projections thereon distributed therearound in angularly spaced relation and engaging said outer surface of said filler at angularly spaced points, said skirt portion having a plurality of local outward projections interspersed angularly between said inward projections and engaging said annular wall of said jacket at angularly spaced points, said skirt portion being substantially circular when in a free state but being flexed in wave-like fashion when mounted between said jacket and said filler, said skirt portion being flexed outwardly at each inward projection.

10. A gasket, comprising an annular body, an inner flange portion on said body and having an annular lip on its under side, and a depending flexible thin-walled annular substantially circular skirt portion on said body and having a plurality of local inward projections thereon distributed therearound in angularly spaced relation, said skirt portion having a plurality of local outward projections interspersed angularly between said inward projections.

11. A gasket having an annular body with an annular sealing element thereon, and a flexible thin-walled annular skirt formation on said body, said skirt formation having a plurality of local inward projections thereon distributed therearound in angularly spaced relation to one another, said skirt formation having a plurality of local angularly spaced-apart outward projections interspersed angularly between said inward projections.

References Cited in the file of this patent
UNITED STATES PATENTS

| | | |
|---|---|---|
| 2,207,543 | Knapp | July 9, 1940 |
| 2,443,086 | Turenne | June 8, 1948 |